Patented Jan. 24, 1933

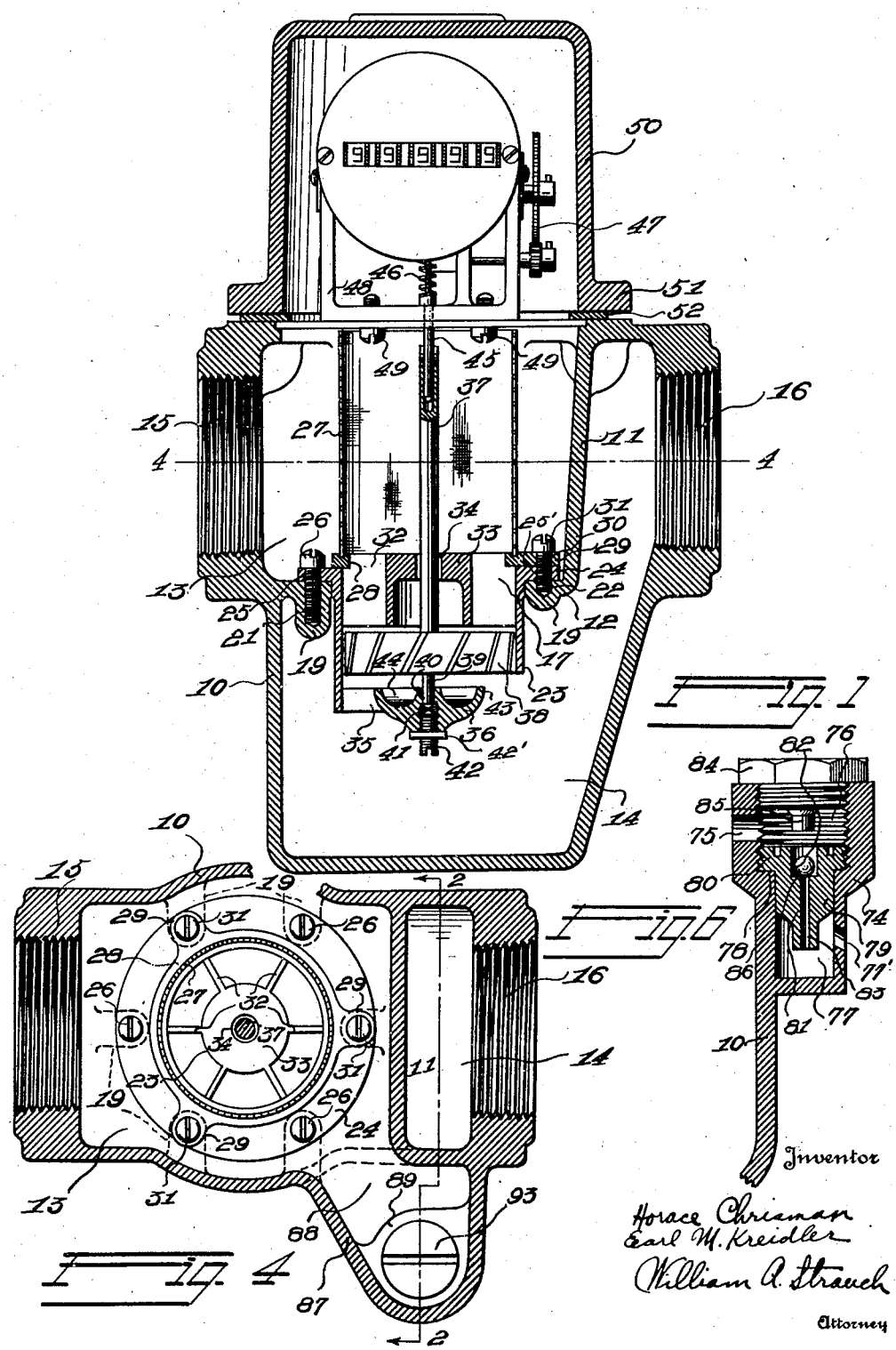

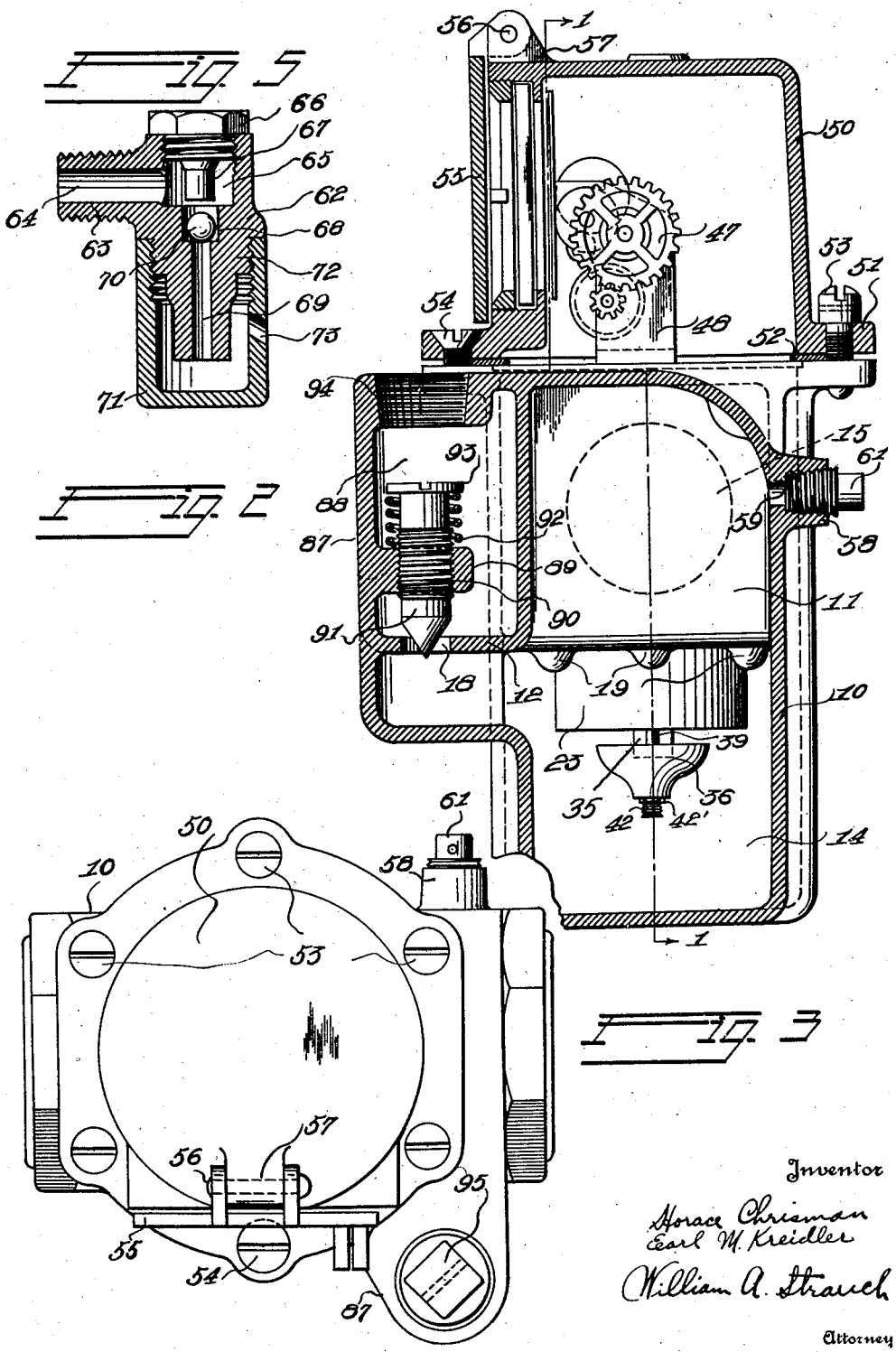

1,895,023

UNITED STATES PATENT OFFICE

HORACE CHRISMAN, OF PITTSBURGH, AND EARL M. KREIDLER, OF WILKINSBURG, PENNSYLVANIA, ASSIGNORS TO PITTSBURGH EQUITABLE METER COMPANY, OF PITTSBURGH, PENNSYLVANIA

LIQUID METER

Application filed November 29, 1927. Serial No. 236,551.

This invention relates to liquid meters and is particularly directed to devices for metering liquids such as gasoline and the like.

Wherever liquids are dispensed, as in gasoline filling stations, the dispensing mechanism is usually in charge of an attendant. It is therefore desirable both in the interest of the proprietor and patrons that the pump or other dispensing device be provided with an accurate comparatively low cost meter which will indicate at all times the total quantity of liquid that has been dispensed and to which access by the attendant may be prevented. The provision of such meter will enable the proprietor to accurately check up the business done with the least possible delay and difficulty.

In providing a gasoline pump or other dispensing device with a meter of the above noted character it is important that the meter be provided with an adjustable means whereby the meter reading may be readily corrected should it be found that a greater or lesser quantity of liquid flowed through the meter than the reading indicates. It is also desirable that the adjustable means be accessible so that adjustments can be made conveniently and rapidly saving time which is important about filling stations.

Accordingly a primary object of our invention is the provision of a meter, simple in construction and of comparatively low cost, compact and durable and adapted to accurately meter liquids that are dispensed by various devices with which the meter may be associated.

Another object of the invention is the provision of a meter provided with an improved adjustable correcting means to insure the dispensing of a quantity of liquid equal to the amount indicated by the readings of the meter.

Still another object of this invention is the provision of a meter provided with an adjustable correcting means which while accessible, is arranged to minimize the dangers from inadvertent introduction of foreign matter into the meter, and so that corrections can be made conveniently and expeditiously.

A still further object of this invention is the provision of a vacuum breaker adapted to prevent the creation of a vacuum within the meter casing upon delivery of liquid therefrom.

With these and other objects in view as will become apparent from the following disclosure and the terms of the appended claims, reference will be had to the accompanying drawings forming a part thereof and in which:—

Figure 1 is a vertical sectional view through our improved meter as represented by the line 1—1 of Figure 2.

Figure 2 is a vertical sectional view at right angles to the view shown in Figure 1 and taken on planes represented by line 2—2 in Figure 4, the casing for the registering mechanism being shown in section.

Figure 3 is a top plan view of our improved meter and

Figure 4 is a transverse sectional view through the meter on the plane represented by the line 4—4 in Figure 1.

Figure 5 is a central longitudinal sectional view of a detachable vacuum breaker forming one of the elements of our invention, and Figure 6 is a similar view in which the vacuum breaker is formed integrally with the meter casing.

Referring to the drawings by reference characters in which like characters designate like parts, 10 designates a casing provided with a vertical partition 11 and a horizontal partition 12 forming with the walls of casing 10 an intake compartment 13 and a discharge compartment 14. A threaded port 15 is provided in casing 10 for connection with the feed line to establish communication with intake compartment 13, and a threaded port 16 is provided in casing 10 in communication with compartment 14 which is adapted for connection with a discharge line.

As shown in the drawings, compartment 14 extends below as well as about one side of compartment 13 and the ports 15 and 16 are arranged in horizontal alinement to cause in operation a normal level of liquid to be maintained in both compartments insuring the submergence continuously of the turbine member hereinafter described.

Communication between the two compartments 13 and 14 is established by the ports 17 and 18 provided in horizontal partition 12. Partition 12 on its under side and adjacent the edge of the port 17 is provided with a plurality of bosses 19, preferably six in number, three of which in alternation with the other three are provided with threaded bores 21 and the other three are provided with comparatively shallow drilled holes 22.

Disposed within port 17 is a casting 23 provided with an outwardly directed flange 24 on the outer end thereof adapted to rest on the partition 12 above the bosses 19. Flange 24 is provided with three threaded apertures 25' and three alternately disposed plain apertures 25 which latter are adapted to receive three screws 26 which are threaded into threaded bores 21 in bosses 19, the screws serving to draw flange 24 into close engagement with the partition 12 adjacent the port 17. The three threaded apertures 25' are adapted to aline with the drilled holes 22.

Disposed over the port 17 is a vertically arranged cylindrical screen 27 adapted to prevent foreign matter in the liquid contained in chamber 13 from passing through the metering mechanism into chamber 14. Cylindrical screen 27 has the lower end thereof suitably secured in a ring 28 which is removably secured to flange 24. Ring 28 is provided with three lugs or ears 29 each of which is provided with a plain aperture 30 adapted to aline with the three threaded apertures 25' in alignment with drilled holes 22. Ring 28 is firmly secured to the flange 24 by means of three screws 31 which are threaded into the alined threaded apertures 25' and through plain apertures 30 with their inner ends projecting into the drilled holes 22. By providing the holes 22 different length screws can be used and advantage of the full length of thread obtained to securely draw the ring 28 into engagement with the flange 24. Flange 24 as shown is comparatively thin and if the screws 31 were limited in their insertion by the ends thereof engaging the outer surface of partition 12, unless the screws were made of accurate length the ring 28 would not be securely fastened to flange 24 or the ring and flange would not be brought into full engagement.

Casting 23 is provided with a plurality of inwardly extending vertically disposed and radially arranged ribs 32 which at their inner ends are integrally united with a hub member 33 in turn provided with a central aperture 34. Integrally connected with casting 23 by means of an arm 35 is a bearing block or housing 36 and a vertically extending shaft 37 is centrally disposed within the port 17 and screen 27 and extends freely through aperture 34. Suitably secured to shaft 37 adjacent the lower end thereof is a turbine or impeller element 38 disposed within cylindrical casting 23 between the ribs 32 and bearing block or housing 36 and extending downwardly from turbine element 38 is a reduced shaft 39. Shaft 39 extends into an aperture 40 in the central portion of block 36 its end being in engagement with thrust bearing 41 which is adjustable by means of a stud 42 threadedly supported in block 36 in vertical alinement with shaft 39 and secured in position by lock nut 42'.

Block or housing 36 is provided with an annular lip 43 forming with the central portion of the block an annular channel 44. By the provision of the channel 44 a portion of the liquid running downwardly through the turbine or impeller member 38 is directed upwardly against the bottom of the turbine member. By this arrangement the turbine or impeller 38 is subject to opposite pressures which are more or less equalized, as a result of which the bearing block 36 and stud 42 are substantially relieved of the downward thrust. Turbine or impeller member 38 is thus substantially balanced, and its response to flows is very sensitive, by virtue of the reduction in friction.

Secured within the upper end of the shaft 37 is a reduced shaft section 45 provided on the upper end thereof with a worm 46 meshing with and driving a pinion of the dial operating mechanism 47 which is supported from the top of the casing 10 by means of a suitable frame 48 secured in position by means of the securing elements 49.

A suitable housing or cover 50 provided with a base flange 51 is secured to the top of casing 10 through the interposition of a suitable gasket 52 by means of the securing elements 53 and 54, the securing element 54 being in the nature of a flat head screw to allow for the swinging movement of a door or closure plate 55 which is hinged at 56 to a lug 57 integral with the cover 50. The door 55 is suitably secured in position to cover the indicating members of the meter and is adapted to be swung open when it is desired to take a reading of the meter.

As is shown in Figures 2 and 3, the wall of casing 10 is provided with a boss 58 provided with an internally threaded aperture 59 in communication with compartment 14. Aperture 59 is arranged for attachment of a vent pipe or vacuum breaker of any suitable construction to insure quick draining of the hose when used with a dry hose pump or an installation in which the hose is emptied after a measured quantity of liquid is dispensed. When used on a wet hose installation or an installation in which the supply hose is maintained filled, the vent pipe or vacuum breaker is not necessary and a screw threaded plug 61 as shown in Figures 2 and 3 is placed in aperture 59.

In Figure 5 is shown one form of vacuum breaker which is adapted to be connected with the aperture 59.

The vacuum breaker comprises a casting 62 provided with an externally threaded extension 63 adapted to be threadedly engaged with the threaded aperture 59 in the casing 10 which aperture 59 is in communication with the discharge compartment as shown.

The extension 63 is provided with a centrally disposed longitudinal bore 64 in communication with a vertically disposed cylindrical chamber 65 the outer end of which is internally threaded to receive an externally threaded plug 66 provided with a centrally disposed projection 67 which terminates short of the bottom of the chamber 65. Below the chamber 65 and in communication therewith is a centrally disposed cylindrical recess 68 which at the bottom thereof is in communication with a comparatively small cylindrical bore 69 which terminates at the lower end of the casting 62.

The bore 64, chamber 65, recess 68 and bore 69 jointly provide communication between the discharge compartment of the meter and the atmosphere whereby air can enter the compartment.

In order to prevent the escape of liquid from the meter thru the vacuum breaker, a check valve 70 is provided which is preferably an aluminum ball adapted normally to rest upon and close the upper end of the bore 69 to prevent the escape of liquid thru the bore 69 but adapted upon creation of a vacuum or partial vacuum within the meter to be lifted from its seat by atmospheric pressure to thus equalize the pressures.

In order to prevent the accumulation of dirt in the bore 69, a cap 71 is provided which has its open end internally threaded as shown adapted to engage an externally threaded shoulder portion 72 of the casting 62. The cap 71 is provided with an angularly disposed orifice 73 to put the interior of the cap in communication with the atmosphere.

Instead of the detachable form of vacuum breaker, the form shown in Figure 6 may be employed in which the casing 74 of the vacuum breaker is formed integrally with the meter casing 10 which is provided with a bore 75 establishing communication between the interior of the meter and an internally threaded vertically disposed chamber 76 in the casing 74.

Below the chamber 76 and in vertical alinement therewith is a second chamber 77 of less diameter than the chamber 76 defining therebetween a shoulder 78. A separate valve member 79 is provided which has an externally threaded head portion 80 adapted to engage the internally threaded chamber 76 and rest upon the shoulder 78. The valve member 79 further includes a body portion 81 adapted to rest within the chamber 77.

Formed within the valve member 79 is a recess 82 which at its upper end is in communication with the chamber 76 and at its lower end is in communication with a bore 83 which extends therefrom to the lower end of the valve member.

An externally threaded cap 84 is engaged within the upper end of the chamber 76 and is provided with a centrally disposed projection 85 adapted to prevent the check valve 86 from leaving the recess 82. An angularly disposed bore 77' is provided in casing 74 to establish communication between the interior thereof and the atmosphere.

As is clearly illustrated in Figures 2 and 4, casing 10 is outwardly extended at 87 providing a side compartment 88 in communication with compartment 13 and the wall of extension 87 is provided with an inwardly extending lug 89 provided with an internally threaded aperture 90 in vertical alinement with the port 18.

Threadedly engaged within the aperture 90 is an adjustable needle valve 91 which controls the flow of liquid through port 18. A spring 92 is interposed between lug 89 and head 93 of the valve to hold the valve in adjusted position. Head 93 is slotted for engagement with a screw driver to adjust the valve and head 93 is accessible through an internally threaded aperture 94 provided in the top of casing 10 in vertical alinement with valve 91. Aperture 94 is normally closed by means of a suitable plug 95.

In the operation of the meter hereinabove described the liquid to be metered enters the meter from the feed line through port 15 into compartment 13. Most of the liquid enters compartment 14 through the port 17, being freed from foreign and solid substances by means of screen 27. From port 17, the liquid flows downward between the ribs 32 and is directed through turbine or impeller element 38 which is caused to rotate imparting rotation to shaft 37 and to indicating mechanism 47 within the cover 50. After passing through turbine element, the liquid is directed against the bearing block 36, the channel 44 of which causes a portion of the liquid to be directed upwardly against the bottom of the turbine element which more or less equalizes the pressure against opposite faces of the turbine element and as a consequence stud 42 is substantially relieved of the downward thrust. The liquid flowing past the turbine member passes through compartment 14 and port 16 into the delivery pipe or hose.

When the meter is assembled, the needle valve 91 will be opened sufficiently to permit a sufficient quantity of liquid to flow through port 18 and the registering mechanism and turbine shaft will be adjusted so that the registering or indicating mechanism will register the exact quantity of liquid that is discharged through the delivery hose.

The meter is then tested from time to time and if it is found that the mechanism is registering more liquid than is discharged, the needle valve will be opened sufficiently to cause the deficient quantity to flow through the port or by-pass 18, and if the mechanism registers less than the quantity delivered the valve will be closed more or less to restrict the flow through the port 18.

In this manner, the registering mechanism may be conveniently and rapidly adjusted to register accurately the quantity of liquid that is discharged through the port 18.

It is to be particularly noted that the needle valve is very accessible for adjustment through the opening 94 in the top of the casing 10, and that the port 18 and threaded apertures 90 and 94 are in alinement in the casing 10 so that the machine work on the by-pass parts may be done expeditiously and at comparatively small cost.

By providing the access opening to the regulating needle valve through the intake compartment any dirt or foreign matter falling into the opening during adjustment is caught by the screen and kept from the registering mechanism. It will further be noted upon reference to Figure 2, that the adjustable needle valve is comparatively short and has a comparatively long threaded engagement in lug 89 with needle valve 91 comparatively close to the port 18 thus insuring a central disposition of valve relative to the port.

By supporting the screen 27 from the ring 28 it is only necessary to remove the three screws 31 whereupon the ring and screen as a unit can be removed for cleaning purposes and the drilled holes 22 make it possible to use commercial machine screws of varying length with the assurance that when inserted, ring 28 will be drawn into secure and close contact with the flange 24.

By providing the meter with a vacuum breaker as hereinabove disclosed, the liquid will always flow freely and uniformly from the meter thru the discharge hose as the valves 70 or 86 function to maintain equal pressures within and without the meter thus obviating the creation of a vacuum within the meter which would seriously interfere with the flow from the discharge hose.

While we have shown and described one illustrative embodiment only of our invention, it is to be understood that the invention is not restricted thereto, any changes or alterations as fairly fall within the scope of the appended claims is contemplated as within the spirit of our invention. Accordingly what is desired to be secured by Letters Patent and claimed as new is:—

1. A liquid meter comprising a casing having inlet and outlet ports, means dividing said casing into two compartments, there being a port in said means establishing communication between said compartments, said means provided with a plurality of lugs adjacent the periphery of said port, some of said lugs provided with threaded apertures, the other lugs provided with drilled holes, a flanged casting member supported within said communicating port, the flange of said casting member provided with a plurality of drilled and threaded apertures equal in number to and adapted to register with said threaded apertures and said drilled holes respectively, securing elements extending through said drilled holes in said flange and threadedly engaged within said threaded apertures in said lugs to secure said flange to said means, a ring supported on said flange, said ring provided with a plurality of apertured lugs, securing members extending through said apertured lugs and threadedly engaged with said threaded apertures in said flange with the inner ends thereof resting within said drilled holes, and a screen supported by said ring.

2. A liquid meter comprising a casing having inlet and outlet ports, means dividing the casing into two compartments, there being a port in said means establishing communication between said compartments, a turbine element within said communicating port, a registering mechanism supported on said casing, a shaft connecting said turbine element and said registering mechanism, a casting member supported within said communicating port in surrounding relation to said turbine element, a cylindrical screen, means removably securing said screen to said casting in surrounding relation to said shaft, a combined bearing and pressure equalizing block supported by said casting, an adjustable thrust bearing formed therein, and a shaft extending from said turbine element into said combined bearing and pressure equalizing block with the end thereof in engagement with the adjustable thrust bearing.

3. A liquid meter comprising a casing having inlet and outlet ports, means dividing the casing into two compartments, liquid measuring means between said compartments, a vacuum breaker comprising a casing formed by said meter casing and a cylindrical chamber within said vacuum breaker casing, a second chamber of less diameter in alinement with and communicating with said first chamber, said chambers having a shoulder therebetween, there being a port in the wall of said second chamber in communication with the atmosphere, a valve member provided with an externally threaded head portion engaged within said first chamber and resting upon said shoulder, a check valve within said valve member, valve movement limiting means within said first chamber, and communicating means between said first chamber and one of said compartments.

4. A liquid meter comprising a casing having inlet and outlet ports in substantial alinement, a wall dividing the casing into two compartments, one of which communicates with said inlet and the other of which communicates with said outlet, a portion of said wall being arranged below said alined inlet and outlet and being provided with an opening, a casting provided with lateral flanges arranged in said opening with said flanges disposed on the portions of said wall surrounding said opening, an impeller rotatably mounted in said casting, said casing having an opening, directing vanes secured to said casting to direct liquid to said impeller, the vanes being mounted on said casting over the opening in said wall, fastening elements to secure said casting to said wall, said fastening elements being insertable and removable through said last named opening in said casing, whereby said impeller and casting may be readily removed from said casing as a unit through said opening, a screen above said casting, and fastening elements securing said screen to said casting only.

5. The combination defined in claim 4 wherein the fastening elements for said screen are insertable and removable through said casing opening so that said screen may be readily removed through said opening, without disconnecting said casting.

6. In a liquid meter, an intake compartment, a discharge compartment, one of said compartments having an internally threaded aperture, liquid measuring means operable by liquid flow between said compartments, a vacuum breaker having an externally threaded projection adapted to be screwed into the threaded aperture, there being a bore within said projection, a chamber in communication with said bore, there being a second bore in communication with said chamber and with the atmosphere, said chamber being larger than both said bores, a check valve between said chamber and said second bore, and a valve movement limiting the projection with said chamber.

7. In a liquid meter, an intake compartment, a discharge compartment, one of said compartments having an internally threaded aperture, a casting comprising an externally threaded projection adapted to be threaded into the internally threaded aperture, a second projection at right angles to said first projection, there being a bore within each projection, said bores at adjacent ends communicating with an internally threaded chamber, a valve between said chamber and one of said bores, an externally threaded cap in said internally threaded chamber, a valve movement limiting projection carried by said cap, and a dust cap removably secured to said second projection and having a port in communication with the atmosphere.

In testimony whereof we affix our signatures.

HORACE CHRISMAN.
EARL M. KREIDLER.